(12) United States Patent
Martin et al.

(10) Patent No.: US 7,224,347 B2
(45) Date of Patent: May 29, 2007

(54) WRITEBOARD METHOD AND APPARATUS

(75) Inventors: Eric Martin, Corvallis, OR (US);
Andrew Koll, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 620 days.

(21) Appl. No.: 10/143,257

(22) Filed: May 9, 2002

(65) Prior Publication Data
US 2003/0210236 A1    Nov. 13, 2003

(51) Int. Cl.
*G09G 5/00* (2006.01)

(52) U.S. Cl. ...................... 345/173; 345/175

(58) Field of Classification Search ............ 345/173–8, 345/158, 82–4, 81, 175, 207; 178/18.01–11, 178/18.09; 349/12
See application file for complete search history.

(56) References Cited

U.S. PATENT DOCUMENTS

| | | | |
|---|---|---|---|
| 33,936 A * | 12/1861 | Miyamori et al. ............ 417/388 |
| 4,713,698 A | 12/1987 | Takahashi et al. | |
| 4,803,564 A | 2/1989 | Sakai | |
| 5,023,408 A | 6/1991 | Murakami et al. | |
| 5,402,151 A * | 3/1995 | Duwaer ....................... 345/173 |
| 5,448,263 A * | 9/1995 | Martin ........................ 345/173 |
| 5,455,906 A | 10/1995 | Usuda | |
| 5,495,269 A | 2/1996 | Elrod et al. | |
| RE35,329 E | 9/1996 | Murakami et al. | |
| 5,790,114 A | 8/1998 | Geaghan et al. | |
| 5,903,252 A | 5/1999 | Ogata | |
| 6,128,014 A | 10/2000 | Nakagawa et al. | |
| 6,177,927 B1 * | 1/2001 | Chery et al. ................. 345/173 |
| 6,229,526 B1 * | 5/2001 | Berstis ....................... 345/158 |
| 6,310,615 B1 * | 10/2001 | Davis et al. ................. 345/173 |
| 6,318,825 B1 | 11/2001 | Carau, Sr. | |
| 6,320,597 B1 | 11/2001 | Ieperen | |
| 6,326,954 B1 | 12/2001 | Van Ieperen | |
| 6,335,724 B1 | 1/2002 | Takekawa et al. | |
| 6,353,193 B1 | 3/2002 | Atwood et al. | |
| 2003/0151596 A1 * | 8/2003 | Moyne et al. | |
| 2003/0201956 A1 * | 10/2003 | Anderson et al. ............ 345/82 |

* cited by examiner

*Primary Examiner*—Jimmy H. Nguyen
*Assistant Examiner*—Tammy Pham

(57) ABSTRACT

A writeboard according to an embodiment of the invention includes plural display cells capable of controlling light within a visible-light spectrum, the display cells being arranged over a display surface of the writeboard. The writeboard also typically includes plural memory cells coupled with the display cells, and plural first receivers arranged with the display cells and the memory cells over the display surface. The first receivers typically are configured to receive transmitted writing information and to communicate the transmitted writing information to corresponding memory cells for storage. Corresponding display cells thus may be selectively activated in accordance with the transmitted writing information.

56 Claims, 3 Drawing Sheets

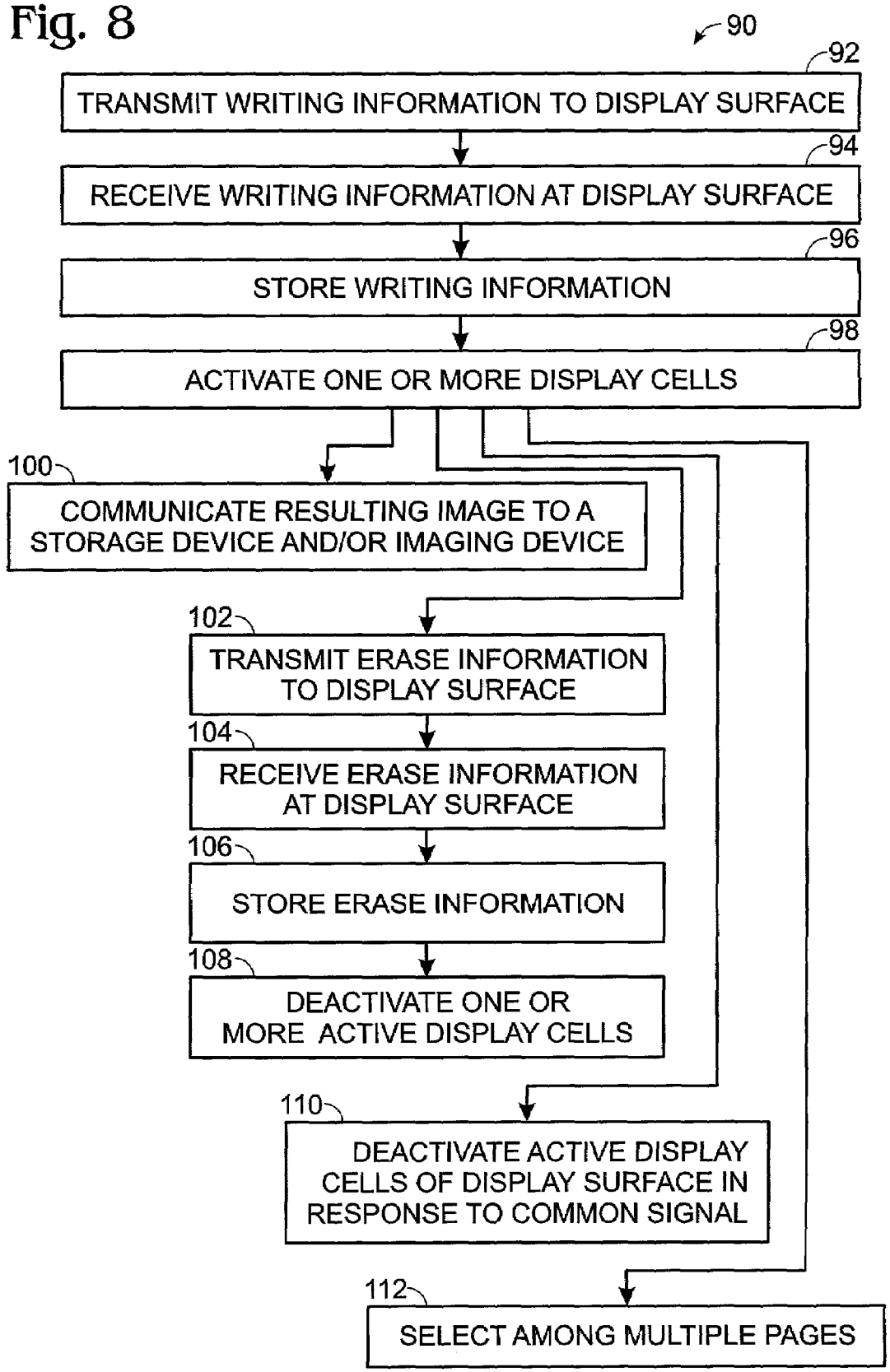

WRITEBOARD METHOD AND APPARATUS

BACKGROUND

Blackboards, whiteboards, and other display surfaces (collectively "writeboards") are often used to convey information to a group of people, such as students or meeting participants. Such writeboards are typically used with a marking implement and an eraser. In the case of a blackboard, the marking implement may be chalk and the eraser may be a composite fiber block. For whiteboards, the marking implement may be a dry erase marker, and the eraser a foam or fiber block adapted to remove dry erase markings from the whiteboard surface.

Current writeboards have certain disadvantages. For example, retaining information printed on such writeboards may require manual copying. In certain embodiments, while information written on a writeboard may be scanned or captured electronically, such systems do not provide for subsequently displaying that information with the writeboard once it has been removed from the writeboard. Additionally, markings on such boards may be difficult for all students in a classroom, or participants in a meeting room to observe. Thus, based on the foregoing, alternative writeboard approaches may be desirable.

SUMMARY OF THE INVENTION

A writeboard according to an embodiment of the invention includes plural display cells capable of controlling light within a visible-light spectrum, the display cells being arranged over a display surface of the writeboard. The writeboard also typically includes plural memory cells coupled with the display cells, and plural first receivers arranged with the display cells and the memory cells over the display surface. The first receivers typically are configured to receive transmitted writing information and to communicate the transmitted writing information to corresponding memory cells for storage. Corresponding display cells thus may be selectively activated in accordance with the transmitted writing information.

BRIEF DESCRIPTION OF THE DRAWINGS

FIG. 8 is a flowchart illustrating a method of display according to an embodiment of the invention.

DETAILED DESCRIPTION OF THE PREFERRED EMBODIMENT

Figure 1:
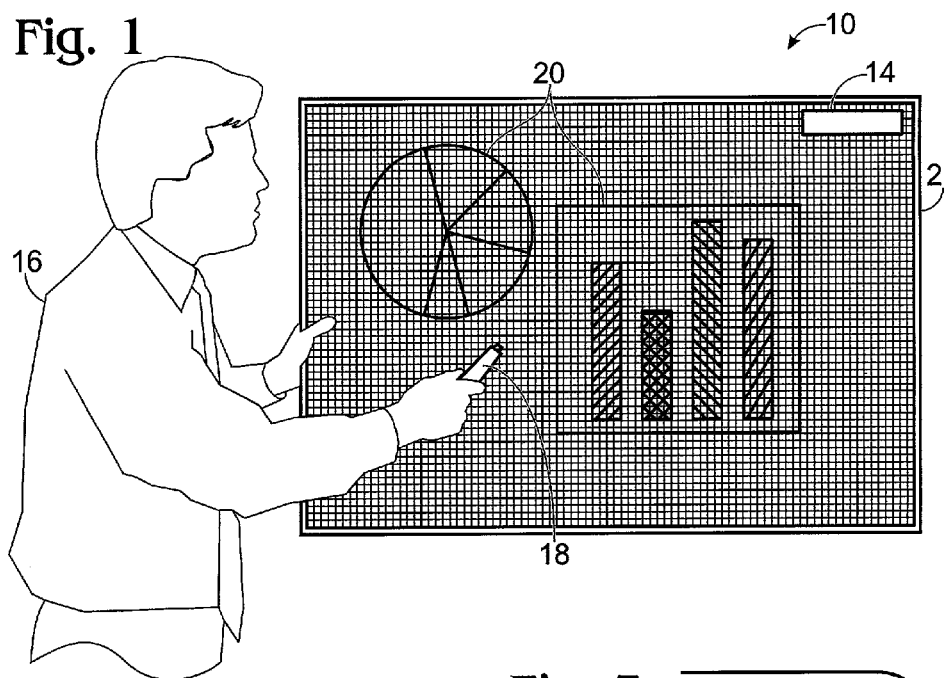
FIG. 1 is a plan view of a writeboard system according to an embodiment of the invention.

FIG. 1 illustrates an electronic writeboard system according to an embodiment of the invention, indicated generally at 10. System 10 includes writeboard 12. Writeboard 12 is shown segmented, indicating an arrangement of components, as will be discussed below, which may cooperate with one another to display information. Briefly, writeboard 12 may include a plurality of display cells arranged over its surface. For the sake of simplicity, emissive display cells will be described in connection with the embodiments of the invention discussed herein. However, it will be appreciated that these display cells may be emissive, transmissive, or take other forms, and the invention is not limited in scope to any particular type of display cell. Writeboard 12 may also include control section 14, which will be discussed in further detail hereafter.

A person 16 may use system 10 with a writing implement 18 to communicate writing information to writeboard 12 to produce image 20. As is discussed in more detail below, writing implement 18 may include one or more transmission sources for transmitting writing information, also referred to as writing signals, and writeboard 12 may include receivers for receiving, and memory cells for retaining image 20. This configuration may allow writing implement 18 to be used much like a traditional writing implement, such as a dry erase marker.

Figure 2:
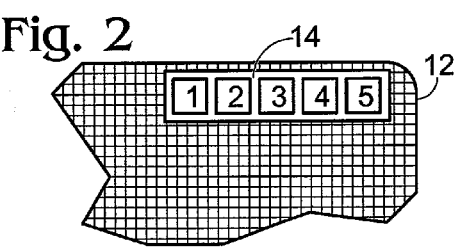
FIG. 2 is a fragmentary, more detailed view of a control sensor section of the writeboard shown in FIG. 1.

Referring to FIG. 2, a fragmentary portion of writeboard 12 is shown, which illustrates control section 14 in more detail. Control section 14 may include plural control sensors 1-5. Control sensors 1-5 may include mechanical switches or may include receivers, as will be discussed below. Control sensors 1-5 may be used to initiate various functions of writeboard 12, such as selecting among plural display "pages", selecting from between writing and projecting functionality, or "erasing" writeboard 12. A display page may be defined as a set of associated memory cells coupled with the display cells of writeboard 12. In this regard, the display cells may have plural memory cells coupled with them (via a selection circuit, such as a multiplexer) to provide for the plural display pages, as is discussed further below. Similarly, a selection circuit, such as a multiplexer, may be used to select from between writing functionality employing the memory cells and projection functionality wherein a received projection signal is dynamically displayed. Erasing writeboard 12 using control sensors 1-5 may include contemporaneously deactivating substantially all activated display cells, effectively clearing, or erasing writeboard 12 via a common erase signal, as is also discussed in further detail below.

Figure 3:
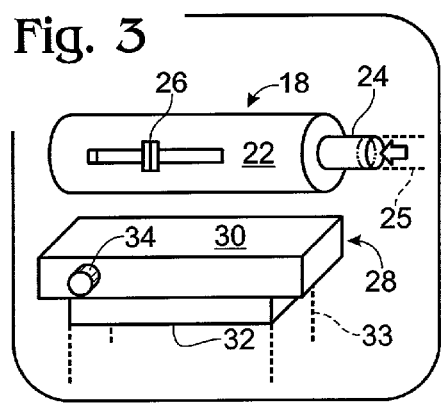
FIG. 3 is a writing implement and eraser according to an embodiment of the invention.

Referring to FIG. 3, writing implement 18 is shown in more detail along with an erasing implement 28. Writing implement 18 may include a body portion 22 and a transmitter portion 24. Transmitter portion 24 may include a pressure sensitive switch (not shown), which may be activated by transmitter portion 24 being depressed into body 22, as indicated by the arrow in FIG. 3. As was previously indicated, this may allow writing implement 18 to function much like a traditional writing implement (e.g. a dry erase marker). In this respect, writing information may be communicated when writing implement 18 is in contact with write board 12, thereby actuating the pressure sensitive switch and activating a transmission source included in transmitter portion 24. Transmitter 24 may communicate the writing information using a very narrow field of transmission (such as using beam 25), so as to accurately communicate desired locations on writeboard 12 for displaying image 20.

Writing implement 18 may further include selection mechanism 26, which may be used to select among various frequencies, commands or transmission sources included in transmitter portion 24, as was previously indicated. Selecting among transmission sources may allow for variation in the display of the writing information 20, or control of writeboard 12 using control sensors 1-5. For example, each transmission source included in transmitter portion 24 may correspond with a display color (e.g. red, green or blue), or may be used to activate control sensors 1-5 included in control section 14 of writeboard 12. It will be appreciated that various receivers may be included with writeboard 12 that are responsive to the various transmission sources included in writing implement 18.

Erasing implement 28 may include a body portion 30 and a transmitter portion 32. Transmitter portion 32 may be activated by button 34. When activated, transmitter portion 32 may communicate erase information to corresponding receivers included in writeboard 12. Receiving the erase information (also referred to as erasure signals) may result in activated display cells being deactivated, as will be discussed in further detail hereafter. As with transmitter 24 of writing implement 18, transmitter portion 32 of erasing implement 28 may communicate the erase information using very narrow fields of transmission (such as transmission field 33), so as to accurately communicate erasure signals to desired locations on writeboard 12 to be cleared, or erased.

As will be appreciated, writing implement 18 may itself serve as an erasing implement. This may be accomplished by assigning differing frequencies, commands or transmission sources in a single transmission implement to differing writing and erasing functions. Similarly, differing frequencies, commands or transmission sources may designate differing presentation colors (it being recognized that erasing may be considered to be a specialized case of writing in a background color). Writing implement 18 and erasing implement 28 thus may also be referred to more generally as communication implements.

Figure 4:
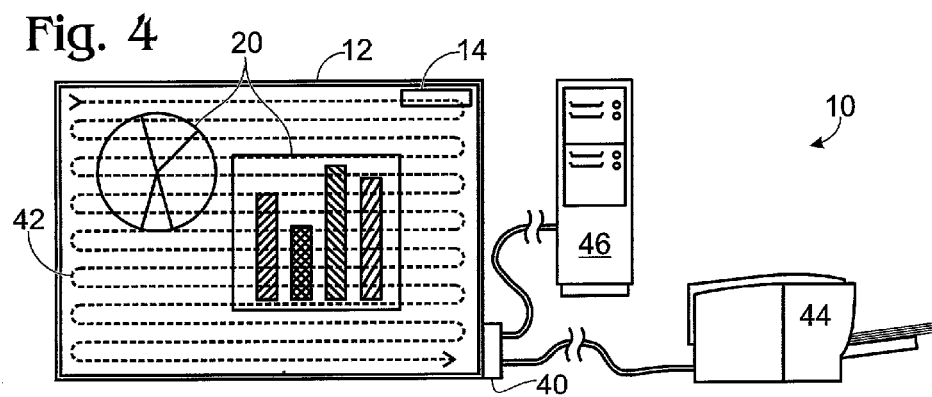
FIG. 4 is another plan view of a writeboard system according to an embodiment of the invention.

Referring now to FIG. 4, writeboard system 10 is shown in additional detail. As discussed above, system 10 may include writeboard 12, which includes control section 14. Writeboard 12 may further include a communication port 40, which may be coupled with connected memory cells 42. It will be appreciated that various approaches for connecting memory cells 42 are known, such as row-column addressing and/or a serial scan chain (as shown in FIG. 4), and the scope of the invention is not limited to any particular approach. Communication port 40 may be further coupled to imaging device 44 and storage device 46. In FIG. 4, imaging device 44 takes the form of a printer and storage device 46 takes the form of a computer, which may include a hard drive, compact disc writer, or other mass, non-volatile storage device. It will also be appreciated that other types of devices, such as palmtop or handheld computers, may be coupled with communications port 40.

The configuration shown in FIG. 4 may allow information corresponding to image 20 to be communicated to imaging device 44 and/or storage device 46. By communicating information contained in connected memory cells 42 to imaging device 44 via communication port 40, image 20 may be printed on a sheet of print media, or displayed at a remote location. Communicating information contained in connected memory cells 42 to storage device 46 via communication port 40 may provide for creation of a data file corresponding with image 20. Additionally, data files contained within storage device 46 corresponding to image 20 may be communicated to connected memory cells 42 via communication port 40. Thus, image 20 may be communicated to storage device 46 from writeboard 12, and then subsequently communicated from storage device 46 to writeboard 12 for display at a later time.

Figure 5:
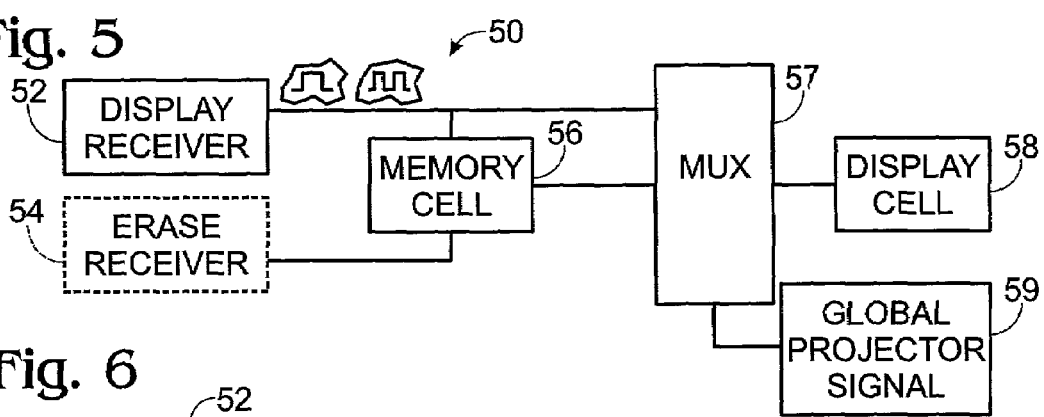
FIG. 5 is a block diagram of a writeboard pixel, including a memory cell, a first receiver and a second receiver, according to an embodiment of the invention.

Referring to FIG. 5, a block diagram of what may be termed a writeboard pixel according to an embodiment of the invention is indicated generally at 50. Pixel 50 may include a display receiver 52, an erase receiver 54, a memory cell 56, a multiplexer (MUX) 57, and a display cell 58. Display receiver 52 and erase receiver 54 may be coupled with memory cell 56. In the depicted embodiment, the display receiver may further be coupled with multiplexer 57. The memory cell similarly may be coupled with multiplexer 57. Multiplexer 57 thus may be employed, based on a global projector signal 59, to select from between a static memory cell output and a dynamic display receiver output, as will be understood from reading further. Multiplexer 57, it will be noted, may be coupled with display cell 58 for display of the selected multiplexer output.

Display receiver 52 may be responsive to signals received from one or more of the transmission sources included in writing implement 18. Display cell 58 may include a red emissive component and display receiver 52 may be responsive to a transmission source included in writing implement 18, which corresponds to red portions of image 20 (not specifically shown). Such display receivers may also be responsive, in a dynamic sense, to transmissions from a projector for corresponding dynamic display of the projected image by the display cells. Display cells including other color emissive components (e.g. green, blue, white, etc.), and display receivers responsive to corresponding transmission sources may also be used. Similarly, a single display receiver may be responsive to differing writing signals so as to provide for different character (or color) writing based on the writing signal (frequency, command, etc.) that is received. Such differential writing signals are illustrated by differing command signals produced by display receiver 52 in FIG. 5. Arranging various colors of pixels over the surface of writeboard 12 may thus allow for image 20 to be displayed in various colors.

Display receiver 52 and erase receiver 54 may operate in a similar fashion, and, in fact, may take the form of a single receiver as demonstrated by dashed-line representation of erase receiver 54. Therefore, the following discussion may apply both receivers, with differences in their functionality being noted. Display receiver 52 and erase receiver 54 may take various forms, and may be responsive to respective transmission sources, as has been previously described. Because communicating writing information (and erase information) may be positionally dependent, transmission sources that transmit a beam may be preferable, as was previously indicated. It will be appreciated that various beam transmitters may be used. However, for simplicity, operation of pixel 50 will be discussed with reference to infrared transmission sources and infrared receivers.

Figure 6:
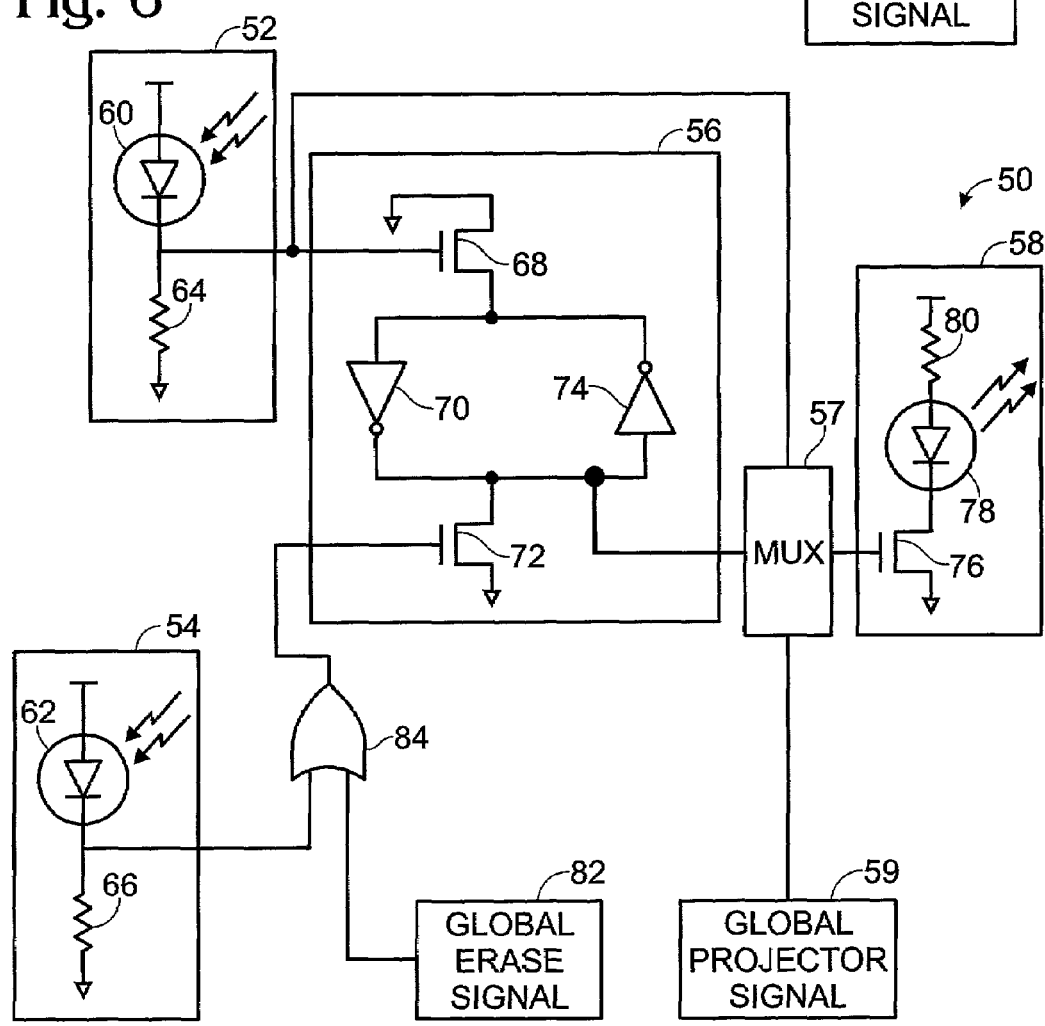
FIG. 6 is a more detailed version of the writeboard pixel of FIG. 5, showing the various blocks in schematic form according to an embodiment of the invention.

Referring to FIG. 6, pixel 50 is shown in schematic form according to an embodiment of the invention. Display receiver 52 and erase receiver 54 may respectively include infrared light-receiving diodes (LRDs) 60 and 62, and resistors 64 and 66. LRD 60 of display receiver 52 may be responsive to signals received from transmitter 24 included in writing implement 18, typically a signal within a specified writing frequency range. Different ranges of infrared light frequencies may be used to indicate, for example, different display colors of image 20. Likewise, LRD 62 erase receiver 54 may be responsive to signals received from transmitter 32, included in erasing implement 28, typically a signal within a specified erasure frequency range.

Receiving infrared light in a frequency range to which LRD 60 is responsive may result in LRD 60 conducting current. This current conduction may result in a voltage drop occurring across resistor 64. Voltage may then be applied to memory cell 56. In FIG. 6, memory cell 56 is shown as a gated data latch (or gated latch). It will be appreciated, however, that memory cell 56 may take other forms, such as cross-coupled NOR gates, a flash memory cell, a static random access memory (SRAM) cell, among numerous other memory cell types.

Voltage applied to memory cell 56 in this fashion may be applied to a gate of transistor 68. Transistor 68 may, in turn, apply electrical ground to an input terminal of inverter 70. For pixel 50, transistor 68 and inverter 70 form half of the gated latch, or memory cell 56. Transistor 72 and inverter 74 form the other half of the gated latch (memory cell 56).

Applying ground to the input terminal of inverter 70 may be referred to as setting memory cell 56, or latching a digital value of "1." By latching a digital "1" in memory cell 56 in response to a writing signal received by display receiver 52, a corresponding pixel 50 (or portion) of image 20 may be held active by writeboard 12 after writing implement 18 is removed from the surface of writeboard 12 (is no longer transmitting to display receiver 52). This may be advantageous over other display systems, which may require continuous projection of information being displayed.

When memory cell 56 is set, a digital "1" may be applied to display cell 58, via multiplexer 57. Applying a digital "1" to the gate of transistor 76 may result in light emitting diode (LED) 78 being activated (conducting current and emitting light). Resistor 80 and transistor 76 may cooperate with LED 78 as a gain circuit for the voltage applied to the gate of transistor 78. Additionally, resistor 80 may regulate current conduction within display cell 58, resulting in reduced variation of emitted-light intensity of LED 76 as compared to a non-current-regulated display cell. Alternatively, display cell 58 may control filtered light (either backlight or reflected light) as opposed to including an emissive component.

As was previously indicated, erase receiver 54 may operate in a similar fashion to display receiver 52. Therefore, its operation will not be discussed in detail, and only relevant differences that relate to the operation of pixel 50 will be noted. Accordingly, LRD 62 may be responsive to erasure signals that may be communicated to writeboard 12 from erasing implement 28. Such erasure signals may result in LRD 62 conducting current and electrical ground being applied to an input terminal of inverter 74, via OR gate 84 and transistor 72. In such a situation, memory cell 56 may be referred to as having been cleared (latching a digital "0"). When memory cell 56 latches a digital "0", electrical ground may be applied to display cell 58 via multiplexer 57. Applying digital "0" to the gate of transistor 76 may result in LED 78 being deactivated (not conducting current or emitting light). As will be appreciated, such an erasure signal may be locally stored via memory cell 56 so as to hold a corresponding pixel 50 (or portion) of image 20 inactive, or erased.

As indicated previously, multiplexer 57 may be configured to receive a control signal, such as global projector signal 59, to accommodate selection from between latched writing/erasure signals from memory cell 56 and dynamic projection signals from display receiver 52. Of course, it will be appreciated that writing/erasure signals effectively originate from display receiver 52 and erase receiver 54.

Also shown in FIG. 6 is global erase signal 82. Global erase signal 82 (and global projection signal 59) may originate from control sensors 1-5, included in control section 14 of writeboard 12. As was discussed earlier, control sensors 1-5 may be mechanical switches or may be receivers similar to display receiver 52 and erase receiver 54. Global erase signal 82 may be coupled with one input terminal of two-input OR gate 84. The second input terminal of OR gate 84 may be coupled with erase receiver 54. In such a situation, individual pixels 50 may be deactivated (erased) via erase receiver 54. Alternatively, the pixels 50 of writeboard 12 may be contemporaneously deactivated via global erase signal 82.

Figure 7:
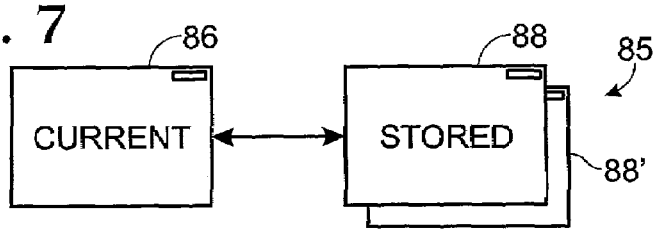
FIG. 7 is a block diagram illustrating a multi-page writeboard configuration according to an embodiment of the invention.

FIG. 7 shows a configuration of a multi-page writeboard according to an embodiment of the invention, indicated generally at 85. As was previously discussed, multiple memory cells 56 may be coupled with each display cell 58. The individual memory cells 56 may be selectable by using a known multiplexer circuit (not shown). Multi-page writeboard 85 may include two or more pages, such as "Current" page 86 and "Stored" pages 88 and 88'. As was discussed above, control sensors 1-5 included in control section 14 may be used to switch between the pages, or directly select the page to be displayed by display cells 58 of multi-page writeboard 85 using a multiplexer circuit (not shown).

FIG. 8 is a flowchart illustrating a method of display according to an embodiment of the invention, which is indicated generally at 90. Method 90 may include transmitting writing information to a display surface at 92, receiving the writing information at the display surface at 94, locally storing the writing information (e.g. via memory cells) at 96, and activating one or more display cells in accordance with the writing information at 98. Method 90, at block 100, may further include communicating information corresponding to a resulting image (e.g. image 20) to an imaging device and/or a storage device (e.g. via row-column addressing or a scan chain), as has been previously described. Method 90 may also further include transmitting erase information to the display surface at 102, receiving the erase information at the display surface at 104, locally storing the erase information at 106, and deactivating one or more active display cells in accordance with the erase information at 108. Method 90, at 110 may also include deactivating active display cells of the display surface in response to a common signal. Method 90 may further include, at 112, selecting among multiple display selections (pages), which may take the form of selectable (e.g. multiplexed) multiple memory cells coupled locally with each display cell, as has been previously described. The method may still further include selecting from between writing/erasure signals in memory and projection signals (e.g., via a multiplexer) as has been described.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A writeboard comprising:
   a plurality of display cells capable of controlling light within a visible-light spectrum, the display cells being arranged over a display surface of the writeboard;
   a plurality of memory cells coupled with the display cells; and
   a plurality of first receivers distributed with the display cells and the memory cells over the display surface, the first receivers, including infrared-receiving diodes, being configured to receive transmitted writing information and communicate the transmitted writing information to corresponding memory cells for storage, wherein such communication and storage selectively result in activation of corresponding display cells in accordance with the transmitted writing information; wherein each of a plurality of pixels of said writeboard comprises said display cell, said memory cell, and said first receivers associated with said memory cell.

2. The writeboard of claim 1, wherein the writing information is communicated via one or more frequency ranges of infrared light.

3. The writeboard of claim 1, further comprising a plurality of second receivers arranged with the display cells and the memory cells over the display surface, the second receivers being configured to receive transmitted erasing information and communicate such erasing information to corresponding memory cells for storage, wherein such communication and storage selectively results in deactivation of corresponding activated display cells in accordance with the transmitted erasing information.

4. The writeboard of claim 3, wherein the second receivers include infrared-receiving diodes.

5. The writeboard of claim 4, wherein the erasing information is communicated via a second frequency range of infrared light.

6. The writeboard of claim 1, wherein the plurality of memory cells are further coupled with a communications port so as to allow information contained in the plurality of memory cells to be communicated external to the writeboard via the communications port.

7. The writeboard of claim 6, wherein the communications port is coupled with the plurality of memory cells such that information may be communicated to the plurality of memory cells from an external data source via the communications port.

8. The writeboard of claim 1, wherein the plurality of display cells include emissive elements coupled with corresponding memory cells so as to be substantially continuously responsive to information contained in the corresponding memory cells.

9. The writeboard of claim 8, wherein the emissive elements include light-emitting diodes.

10. The writeboard of claim 1, wherein the plurality of memory cells include data latches.

11. The writeboard of claim 1, further comprising a control sensor configured to select from plural memory cells coupled with each display cell.

12. The writeboard of claim 1, further comprising a control sensor configured to contemporaneously deactivate substantially all activated display cells.

13. The writeboard of claim 1, further comprising a control sensor configured to select dynamic display of information received by the first receivers.

14. A display system comprising:
   a plurality of emissive display cells capable of controlling light within a visible-light spectrum;
   a plurality of memory cells;
   a plurality of first receivers; and
   a plurality of second receivers, wherein the display cells, memory cells, first receivers and second receivers are distributed over a display surface and coupled so as to activate and deactivate display cells in accordance with information communicated to the first and second receivers; wherein each of a plurality of pixels of said display system comprises said display cell, said memory cell, and said first and second receivers associated with said memory cell.

15. The display system of claim 14, further comprising a writing implement for communicating writing information to one or more of the first receivers, such that the writing information is stored by corresponding memory cells and results in corresponding display cells being held active.

16. The display system of claim 15, wherein the writing implement includes one or more transmission sources, which communicate one or more respective signals including writing information to which corresponding receivers of the first receivers are responsive.

17. The display system of claim 16, wherein the one or more transmission sources include one or more infrared light sources having respective writing frequencies, and wherein the first receivers include infrared receivers responsive to infrared light of the respective writing frequencies.

18. The display system of claim 14, further comprising an erasing implement for communicating erasure information to one or more of the second receivers, such that the erasure information is stored by corresponding memory cells and results in corresponding display cells being held inactivate.

19. The display system of claim 18, wherein the erasing implement includes a transmission source, which communicates a signal including erasure information to which the second receivers are responsive.

20. The display system of claim 19, wherein the transmission source includes an infrared light source having an erasing frequency, and wherein the second receivers include infrared receivers responsive to infrared light of the erasing frequency.

21. The display system of claim 14, wherein the plurality of memory cells are further coupled with a communications port so as to allow information contained in the memory cells to be communicated external to the display surface and information external to the display surface to be communicated to the memory cells via the communications port.

22. The display system of claim 21, wherein the communications port is further coupled with an imaging device so as to display an image corresponding to the information contained in the plurality of memory cells.

23. The display system of claim 22, wherein the display device is a printer and the image is displayed by printing the image on a print media sheet.

24. The display system of claim 21, wherein the communications port is further coupled with a storage device so as to store a data file corresponding to the information contained in the plurality of memory cells within the storage device when information contained in the memory cells is communicated external to the display surface, and to transmit information contained within the storage device to the memory cells when information external to the display surface is communicated to the memory cells.

25. The display system of claim 24, wherein the storage device includes a computer system having a non-volatile storage device.

26. A method of displaying an image comprising:
transmitting a first type of information to a display surface formed at least in part by a plurality of display cells capable of controlling light within a visible-light spectrum, each of the plurality of display cells having at least first and second display states;
receiving the first type of information, by using one of a plurality of first receivers at the display surface;
storing the transmitted information of the first type in one of a plurality of memory cells coupled with said plurality of display cells; and
selectively holding one or more display cells of the plurality of display cells in the first state in accordance with the transmitted information of the first type;
wherein each pixel of said display surface comprises said display cell, said memory cell, and said first receiver associated with said memory cell.

27. The method of claim 26, further comprising transmitting a second type of information to the display surface;
receiving the second type of information at the display surface;
storing the transmitted information of the second type; and
holding one or more display cells of the plurality of display cells in the second state in accordance with the transmitted information of the second type.

28. The method of claim 27, further comprising communicating stored information to an imaging device.

29. The method of claim 27, further comprising communicating stored information to a storage device.

30. The method of claim 26, further comprising selecting among multiple display selections, the display selections each including a set of received information.

31. The method of claim 26, further comprising deactivating active display cells and holding the plurality of display cells active as a result of communicating a writing signal.

32. A writeboard comprising:
a plurality of display means for controlling light within a visible-light spectrum, the display means being arranged over a display surface of the writeboard;
a plurality of memory means coupled with the display means; and
a plurality of first receiver means distributed with the display means and the memory means over the display surface, the first receiver means being configured to receive transmitted writing information and to communicate the transmitted writing information to corresponding memory means for storage, wherein such communication and storage selectively activates corresponding display means in accordance with the transmitted writing information; and
a plurality of second receiver means arranged with the display means; wherein each of a plurality of pixels of said writeboard comprises said display means, said memory means, and said first receiver means associated with said memory means.

33. The writeboard of claim 32, wherein the plurality of second receiver means includes a configuration to receive transmitted erasing information and to communicate such erasing information to corresponding memory means for storage, wherein such communication and storage selectively deactivates corresponding activated display means in accordance with the transmitted erasing information.

34. The writeboard of claim 32, wherein the plurality of display means include emissive elements coupled with corresponding memory means so as to be substantially continuously responsive to information contained in the corresponding memory means.

35. A display system comprising:
a plurality of display means capable of controlling light within a visible-light spectrum;
a plurality of memory means;
a plurality of first receiver means; and
a plurality of second receiver means, wherein the display means, memory means, first receiver means and second receiver means are distributed over a display surface and coupled so as to activate and deactivate display means in accordance with information communicated to the first and second receiver means; wherein each of a plurality of pixels of said display system comprises said display means, said memory means, and said first and second receiver means associated with said memory means.

36. The display system of claim 35 further comprising a writing means for communicating writing information to one or more of the first receiver means, such that the writing information is stored by corresponding memory means and results in corresponding display means being held active.

37. The display system of claim 36, wherein the writing means includes one or more transmission means, which communicate one or more respective writing signals including writing information to which corresponding receiver means of the first receiver means are responsive.

38. The display system of claim 35, further comprising an erasing means for communicating erasure information to one or more of the second receiver means, such that the erasure information is stored by corresponding memory means and results in corresponding display means being held inactivate.

39. The display system of claim 38, wherein the erasing means includes a transmission means, which communicates an erasure signal including erasure information to which the second receiver means are responsive.

40. A method of constructing a display system comprising:
coupling a plurality of first receivers with a plurality of memory cells;
coupling a plurality of second receivers with the plurality of memory cells;
coupling a plurality of display cells with at least one of the memory cells, the first receivers and the second receivers;
distributing the first receivers, memory cells, second receivers, and display cells over a display surface such that the displays cells are selectively held active and inactive in accordance with information communicated to the first and second receivers; wherein each of a plurality of pixels of said display system comprises said display cells, said memory cells, and said first and second receivers associated with said memory cells.

41. The method of claim 40, further comprising operatively coupling, with a housing, one or more transmission sources having respective signals to which corresponding receivers of the first receivers are responsive.

42. The method of claim 40, further comprising operatively coupling, with a housing, a transmission source having a signal to which the second receivers are responsive.

43. The method of claim 40, further comprising coupling a communications port with the memory cells, so as to allow information contained in the memory cells to be communicated external to the display surface and information external to the display surface to be communicated to the memory cells via the communications port.

44. The method of claim 40, further comprising coupling a common signal with the memory cells, so as to deactivate substantially all the display cells in accordance with the common signal.

45. The method of claim 43, further comprising selecting between activation/deactivation of display cells in accordance with the memory cells, and dynamic activation/reactivation of display cells in accordance with at least the first receivers.

46. A display system comprising:
a communication implement configured to transmit display information in a transmission beam; and
a display panel including display cells capable of controlling light within a visible light spectrum, each display cell having associated therewith a memory cell, a first receiver configured to receive transmitted display information, and a second receiver configured to receive transmitted erasing information, whereby such display cells are activated and deactivated in accordance with the display information and the erasing information received by corresponding of the first receivers and the second receivers; wherein each of a plurality of pixels of said display system comprises said display cell, said memory cell, and said first and second receivers associated with said memory cell.

47. The display system of claim 46, wherein received display information for such display cells is stored by corresponding memory cells, such display cells being held active or inactive in accordance with display information stored by such corresponding receivers.

48. An electronic writeboard system, comprising:
a writeboard including a plurality of display cells capable of controlling light within a visible-light spectrum, a plurality of memory cells coupled with the display cells, and a plurality of first receivers distributed with the display cells and the memory cells over a display surface of the writeboard; and
a writing implement configured to transmit writing information to the writeboard, wherein the first receivers are configured to receive transmitted information from the writing implement and communicate the transmitted writing information to corresponding memory cells for storage, and wherein such communication and storage selectively result in activation of corresponding display cells in accordance with the transmitted writing information; wherein each of a plurality of pixels of said writeboard comprises said display cell, said memory cell, and said first receivers associated with said memory cell.

49. The electronic writeboard system of claim 48, wherein the first receivers include infrared-receiving diodes.

50. The electronic writeboard system of claim 49, wherein the writing implement is configured to transmit writing information to the writeboard via a first frequency range of infrared light.

51. The electronic writeboard system of claim 48, further comprising a plurality of second receivers arranged with the display cells and the memory cells over the display surface, and an erasing implement configured to transmit erasing information to the writeboard, wherein the second receivers are configured to receive the transmitted erasing information from the erasing implement and communicate such erasing information to corresponding memory cells for storage, and wherein such communication and storage selectively results in deactivation of corresponding activated display cells in accordance with the transmitted erasing information.

52. The electronic writeboard system of claim 51, wherein the second receivers include infrared-receiving diodes.

53. The electronic writeboard system of claim 52, wherein the erasing implement is configured to transmit the erasing information via a second frequency range of infrared light.

54. The electronic writeboard system of claim 51, wherein the erasing implement is incorporated with the writing implement.

55. The electronic writeboard system of claim 54, wherein the writing implement includes a selection mechanism configured to allow a user to select between a first function in which the writing implement transmits the writing information to the writeboard, and a second function in which the writing implement transmits the erasing information to the writeboard.

56. The electronic writeboard system of claim 55, wherein the writing implement is configured to transmit writing information to the writeboard via a first frequency range of infrared light and to transmit the erasing information via a second frequency range of infrared light, and wherein the selection mechanism is configured to allow the user to select between the first and second frequency ranges of infrared light.

* * * * *